United States Patent [19]
Allison et al.

[11] Patent Number: 6,160,034
[45] Date of Patent: *Dec. 12, 2000

[54] COLORING COMPOSITION

[75] Inventors: Keith Allison, Blandon; Richard Kaiser, Allentown, both of Pa.

[73] Assignee: Binney & Smith Inc., Easton, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/088,923

[22] Filed: Jun. 2, 1998

Related U.S. Application Data

[63] Continuation-in-part of application No. 08/868,180, Jun. 3, 1997, abandoned.

[51] Int. Cl.[7] .................................................. C09D 11/10
[52] U.S. Cl. ........................ 523/161; 524/516; 524/522; 524/523; 260/DIG. 38; 401/198; 106/31.01; 106/31.13; 106/31.45
[58] Field of Search .................... 523/161; 260/DIG. 38; 401/198; 524/522, 523, 516; 106/31.01, 31.13, 31.25

[56] References Cited

U.S. PATENT DOCUMENTS

| | | | |
|---|---|---|---|
| 5,116,410 | 5/1992 | Miller | 106/31.58 |
| 5,288,160 | 2/1994 | Li et al. | 401/198 |
| 5,462,591 | 10/1995 | Karandikar et al. | 106/31.36 |

FOREIGN PATENT DOCUMENTS

| | | | |
|---|---|---|---|
| 466493 | 1/1992 | European Pat. Off. . | |
| 466493A1 | 1/1992 | European Pat. Off. | C09D 11/00 |
| 550891A1 | 7/1993 | European Pat. Off. | C09D 11/16 |
| 0758673A2 | 2/1997 | European Pat. Off. . | |
| 758673 | 2/1997 | European Pat. Off. . | |

OTHER PUBLICATIONS

Rohm and Haas Company product literature and Material Safety Data Sheet for "Maincote Fastrack 77 All–Acrylic Emulsion," Jan., 1997.

Dow Chemical Company Material Safety Data Sheet for "Latex DT 211NA," May 23, 1996.

*Primary Examiner*—Terrel Morris
*Assistant Examiner*—John J. Guarriello
*Attorney, Agent, or Firm*—Leydig, Voit & Mayer, Ltd.

[57] ABSTRACT

The present invention provides a low-bleed coloring composition incorporating a film-forming agent, an alkali-soluble resin, an aqueous carrier, and a colorant. The coloring composition can optionally include one or more of a humectant, a surfactant, a preservative, a drying agent, a pH regulant, a bittering agent or a fragrance. The present invention further provides a mark upon the surface of a substrate. The present invention furter provides a writing instrument comprising the coloring composition.

20 Claims, No Drawings

COLORING COMPOSITION

CROSS REFERENCE TO RELATED APPLICATIONS

This application is a continuation in part of U.S. application Ser. No. 08/868,180, filed on Jun. 3, 1997 now abandon.

TECHNICAL FIELD OF THE INVENTION

The present invention relates to a coloring composition. More specifically, this invention relates to a coloring composition, such as an ink, suitable for use in children's coloring books.

BACKGROUND OF THE INVENTION

Coloring compositions generally are mixtures of colorants (pigments, dyes, etc.) dispersed or dissolved in a carrier fluid. Hydrocarbon solvent-based coloring compositions, such as writing and marker inks, have traditionally been permanent inks. However, along with their desirable permanency, they present several undesirable qualities. The solvent systems utilized in these inks typically include such toxic hydrocarbons as toluene and xylene. Such components can lead to both disposal problems and consumer rejection due to a rising appreciation for the dangers of exposure to toxic chemicals and objection to the chemical odor.

Water-based coloring compositions present an attractive alternative to hydrocarbon-based coloring compositions, primarily because aqueous coloring compositions are less toxic and their odor less offensive than hydrocarbon-based coloring compositions. Water-based coloring compositions are generally made by a mixture of water and a colorant (e.g., a water soluble dye or pigrnent). While some water-based coloring compositions available in the form of marker inks have the desirable quality of good skin and textile fugitivity, they also exhibit the undesirable quality of washing off of the writing surface. Water-based writing and marker inks also tend to smear during application, in part because of long drying time. After being dispensed and dried, such inks are re-wettable and will again smear if later contacted with water. Some of these problems are surmounted by incorporating an acrylic resin, such as an alkali-soluble resin, into the coloring composition.

Coloring compositions are employed to mark on a wide variety of substrates. A commonly employed substrate is paper (or a paper-like material), which is produced in many qualities. In many respects, paper presents a superior writing surface. The surface of paper is generally smooth and even. Moreover, the porosity of paper assists the writing process by drawing the coloring composition into the paper matrix, promoting even application and smooth appearance. However, porous paper is not an ideal writing substrate for all applications. For example, many types of paper (e.g., newsprint, or the highly porous paper commonly employed in children's coloring books) are sufficiently porous to draw a coloring composition through the paper to create a mark on the surface opposite that desired, thereby rendering it difficult to employ both sides of a single sheet of paper. This is commonly referred to as "strike-through" of the ink. Moreover, inks which strike through (or bleed through) paper can actually leave marks on surfaces supporting the paper (such as succeeding sheets of paper in a book, clothing, furniture, and the like). Also, strike-through dulls or reduces the presentation of the color.

Efforts aimed at reducing drying time and strike-through of water-based inks have proven largely unsuccessful. Some commercially available inks reduce strike-through by incorporating additives which substantially increase the viscosity of the coloring composition. For example, hyperthermogelling inks incorporating a high amount of surfactants exhibit a phase change due to the evaporation of a given amount of water (e.g., U.S. Pat. No. 5,462,591). While such inks are useful for some applications (e.g., commercial printing presses), they are too viscous for use in common writing instruments, such as capillary markers with porous nibs.

In view of the foregoing problems, there exists a need for a coloring composition that is quick-drying and which exhibits limited or little strike-through when applied to porous papers such as coloring book paper. There is also a need for such compositions that are washable from skin and common fabrics. Furthermore, such compositions are needed which are suitable for use in common ink-based writing instruments (e.g., capillary markers). The present invention meets these needs and provides a low bleed coloring composition suitable for use in common ink-based marking instruments.

BRIEF SUMMARY OF THE INVENTION

One aspect of the invention is an aqueous coloring composition incorporating a film-forming agent, an alkali-soluble resin, and a colorant. The aqueous coloring composition can optionally include one or more of a humectant, a surfactant, a preservative, a drying agent, a pH regulant, bittering agent or a fragrance. The coloring composition is sufficiently fluid for use in standard writing instrunents, yet it minimally permeates highly porous substrates. Moreover, the coloring composition retains superior color stability, remains fluid during prolonged storage, and is readily washed from skin and common fabrics. The viscosity of the coloring composition can be sufficiently low to be compatible with a variety of commonly employed capillary markers.

The coloring composition is useful for forming marks on a variety of surfaces, especially highly porous paper (or paper-like) surfaces. The mark is formed by applying the aqueous coloring composition to the surface such that the film-forming agent forms a hydroresistant film adhering to the surface; the colorant is then entrapped within the matrix of the film. Such marks are quick drying and exhibit minimal strike-through to the opposite surface of a porous substrate (such as paper).

Another aspect of the invention is a writing instrument incorporating the aqueous coloring composition of the invention. In the preferred embodiment, the writing instrument has a nib and a reservoir containing the coloring composition.

The invention can best be understood with reference to the accompanying detailed description of the preferred embodiments.

DESCRIPTION OF THE PREFERRED EMBODIMENTS

The coloring composition includes a pH-sensitive agent for forming a hydroresistant film following the deposition of the composition upon a substrate. Moieties suitable for use as film-forming agents in the present invention deposit films under high humidity, or even within the fluid emulsion. Generally, such agents have film-forming temperatures in the range of 15–25° C., (e.g., about 20° C.). A preferred film-forming agent includes a polyfunctional amine moiety and a latex having acid functional moieties. In such a system, the latex and the polyfunctional amine can be separate species or the same species (e.g., acid functional moieties and amine finctional moieties can be present within the same polymeric backbone).

The latex is a polymer, generally with an average molecular weight of from about 500 to about 5,000,000 (more typically between about 1,000 to about 1,000,000). The latex can be water soluble, water reducible, or a dispersed polymer (generally having a particle size between about 20 and about 1000 nm). Such latexes are polymerized from monomers commonly included in latex polymers, many of which are disclosed in published European patent application EP 758,673. Preferably, such monomers include acrylic and methacrylic esters and acid functional monomers. Examples of preferred latexes include the following monomers:

1) butyl acrylate and methyl methacrylate,
2) butyl acrylate and styrene,
3) 2-ethyl hexyl acrylate with methyl methacrylate, and
4) 2-ethyl hexyl acrylate with styrene.

The presence of acid finctional monomers permits crosslinking with the polyfunctional amine, thus, the latex preferably contains at least one acid functional monomer (e.g., acrylic acids, methacrylic acids, and combinations thereof). Preferably, the latex has sufficient acid functional groups to have an acid number between 0 and about 390 (e.g., between about 0.8 and about 390), and more preferably between about 0.8 and about 200.

The polyfunctional amine can be polymerized between from about 20% to about 100% (preferably between about 50% and about 100%) from any of several classes of amine-containing monomers. Examples of such monomers include aminoalkyl vinyl esters wherein alkyl groups are straight or branched groups of 2 or 3 carbon atoms; acrylamide or acrylic acid esters; N-acryloxyalkyl-oxazolidines and N-acryloxyalkyltetrahyddro-1,3-oxazines and corresponding components in which the "alkyl" linkage is replaced by alkoxyalkyl and poly(alkoxyalkyl) linkages; and monomers which readily generate amines by hydrolysis. Alternatively, the polyfunctional amine can be a monomer with at least two primary or secondary amino groups (e.g., aliphatic and cycloaliphatic amines each having 2–10 primary or secondary amino groups and from 2 to about 100 carbon atoms). Suitable polymeric and non polymeric polyfunctional amines are disclosed in published European patent application EP 758,673, and other such compounds are known in the art.

Where the film-forming agent includes a latex and a polyfunctional amine, pH sensitivity is effected because the acid functional moieties will crosslink with the amine moieties below a threshold pH, increasing the viscosity of the composition. While different film-forming agents can have different pH thresholds, generally such thresholds are above about 8, and more preferably above about 9. The exact threshold pH can be determined by titrating the composition with an acid, the crosslinking reaction itself (measured by substantial increase in viscosity) serving as an indicator of the threshold. Because the composition preferably is sufficiently fluid for use in a standard marking instrument, as described below, it is especially preferred that the solution chemistry of the composition be such as to impede the film-forming agent from crosslinking during storage or at an otherwise inappropriate time (i.e., a time other than when the composition is applied to the substrate). Thus, to prevent such crosslinkig from occurring prematurely, the pH of the coloring composition is maintained at least at about 8 and more typically at least at about 9 (e.g., by the addition of a base to the composition). Typically, the coloring composition will have a maximal pH of about 10 or about 11, although a composition according to the present invention can have a higher pH (e.g., about 12 or higher), if the resulting composition is stable.

Few commercial preparations have sufficient qualities to be useful as a source of a film-forming agent in the composition of the present invention. Those which are available are generally formulated as aqueous emulsions with a relatively high solid content (e.g., about 30% to about 60% solids by weight of the emulsion) and have viscosities in the range of about 30 cps. to about 70 cps. These formulations permit significant control over the ultimate viscosity of the coloring composition, because little of such emulsion needs to be included to supply a suitable amount of film-forming agent. One preferred commercial preparation is an aqueous emulsion of 35–55 wt. % solid matter manufactured by Dow Chemical and marketed under the trade name DT211-NA. Another preferred commercial preparation formulation, having a threshold pH of about 9.2, is marketed by Rohm and Haas as an aqueous emulsion of 50 wt. % solid matter under the trademark MAINCOTE FASTRACK-77™.

Without being bound by any particular theory, it is believed that when the composition is exposed to air (desirably when applied to a substrate (e.g., paper)), some water (and any volatile pH regulant present) evaporates from the composition. Evaporation of volatile components acidifies the composition. At some point, the pH of the composition falls below the threshold, prompting the film-forming agent to crosslink. As mentioned, where the crosslinking occurs within a container, the composition becomes far too viscous for many applications (e.g., as an ink). However, where such crosslinking occurs following application of the composition to a substrate, the crosslinked agent forms a hydroresistant film upon the surface of the substrate. Generally, the hydroresistant film forms before a significant amount of colorant can enter porous substrates (e.g., paper). Because of the extensive crosslinking, the film is not soluble, and is therefore hydroresistant. Moreover, because the film is not water soluble, it sets before the mark otherwise dries; in this respect, the coloring composition is a quick-setting composition. Also, because the hydroresistant film is not soluble, it is permanent in nature, absent any additives promoting removal (e.g., an alkali-soluble resin). Being hydroresistant, the film prevents fturther permeation of the substrate, effectively confining the colorant to the surface upon which it is applied. However, the other constituents (notably the colorant) associate with the hydroresistant film (e.g., by being trapped within the forming film or incorporated into the hydroresistant film matrix), effectively coupling the colorant to the substrate.

In the usual case, at least about 15% by weight of the total composition film-forming agent must be included in compositions of the present invention to adequately form a hydroresistant film. However, where the coloring composition also includes a surfactant, increased amounts of film-forming agent are usually required to block strike-through of the colorant. The desired viscosity of the coloring composition largely determines the maximum amount of film-forming agent within the coloring composition. For example, where the coloring composition is marker ink, a practical maximum amount of film-forming agent is about 40% by weight of the total composition, as higher concentrations can cause undesirably high viscosity and drying of the coloring composition, resulting in a short "cap-off" time. Of course, the presence of the alkali-soluble resin also affects viscosity; hence, the maximal amount of film-forming agent will depend on the amount of alkali-soluble resin present within the coloring composition. Therefore, the preferred concentration range for most applications is from about 20% to about 30% by weight of the total composition (e.g., about 25 wt. %) film-forming agent.

The coloring composition of the invention also includes an alkali-soluble resin to promote fugitivity from skin and fabrics. The alkali-soluble resin is generally an acrylic resin, i.e., a polymer or copolymer of acrylic or methacrylic esters, including such materials as styrenated acrylic copolymers. Such resins sometimes are referred to as acrylic varnish and lacquer resins or as acrylic film-forming resins. Alkali-soluble acrylic resins are commercially available as substantially pH-neutral emulsions in which the resin is not significantly solubilized. As the pH of an alkali-soluble resin emulsion is increased above neutral, the resin will dissolve.

After application of the coloring composition of the invention to a substrate (e.g., paper), the aqueous carrier begins to evaporate and the pH of the composition drops, as mentioned previously, causing film formation. In contrast with the crosslinking of the film-forming agent, the ability of the alkali-soluble resin to remain in solution depends to a large extent on humidity and solution concentration. Thus, in the context of the present invention, the alkali-soluble resin will not independently form a film as quickly as the film-forming agent. As such, some of the alkali-soluble resin is trapped within the matrix of the hydroresistant film-forming agent film as the film forms.

As discussed herein, the hydroresistant film of the film-forming agent is insoluble in aqueous solutions and is, therefore, permanent. However, the presence of some of the alkali-soluble resin within the matrix of the film effects fugitivity of the film from certain surfaces, as herein described. Basic aqueous solutions can dissolve the alkali-soluble resins, even when trapped within the matrix of the hydroresistant film. When a sufficient amount of alkali-soluble resin is trapped within the matrix, the physical integrity of the film is sufficiently disrupted when the alkali-soluble resin is dissolved. Such disruption significantly weakens the bonds between the film and the substrate onto which it is attached. The weakened film is, therefore, readily removed from the substrate by mechanical agitation. In short, while a hydroresistant film comprising the film-forming agent is not dissolved, it is nonetheless fugitive under basic conditions when a suitable amount of alkali-soluble resin is incorporated into its matrix.

The coloring composition can include any suitable amount of alkali-soluble resin to promote fugitivity. However, in most applications, a minimum amount of alkali-soluble resin equal to about 1% by weight (typically about 5% by weight) of the film-forming agent is required to effect fugitivity. If the composition incorporates too much alkali-soluble resin, the forming film is not suitably hydroresistant to retard the composition from permeating the substrate during application. Furthermore, films incorporating too much alkali-soluble resin are partially disrupted or dissolved during the application of successive layers of the coloring composition (overcoloring), thereby leading to strike-through. Thus, to minimize strike-through of the composition, the amount of alkali-soluble resin typically includes up to about 10% by weight of the film-forming agent; however, the upper limit of the amount of alkali-soluble resin is determined by the capacity of the composition to form a hydroresistant film, as described herein. While the optimal ratio alkali-soluble resin vis-a-vis the film-forming agent depends in large measure on the species of resins employed, the preferred concentration range of the alkali-soluble resin for most applications is from about 0.5% to about 5% by weight of the total composition (e.g., about 1 wt. % to about 3 wt. %).

Alkali-soluble resins typically have minimum film-forming temperatures between about −15° C. to about −10° C. Many commercially available acrylic resin dispersions are alkali-soluble resins for use in the present invention. Generally, such resins are available as pH-neutral emulsions containing 20% to 50% by weight active resin and have viscosities between 20 cps. and 100 cps. For example, an alkali-soluble acrylic resin emulsion marketed by Union Carbide under the trademark CARBOSET XL19™ is a suitable alkali-soluble resin, as is an acrylic emulsion sold by S. C. Johnson under the trademark JONCRYL 95™. Preferred alkali-soluble resin dispersions are sold by Rohm and Haas under the trademarks ACRYSOL WS 24™, ACRYSOL WS 32™, and ACRYSOL WS 68™.

The coloring composition of the invention also includes a colorant. As used herein, the term "colorant" includes any agent capable of delivering a color to a substrate upon which it is applied. Thus, colorants can be dyes (i.e., soluble colorants), pigments (i.e., insoluble or particulate colorants), or any other suitable agent compatible with the composition components. Colorants are commercially available in suitable preparations, such as aqueous solutions containing dyes, or aqueous dispersions containing pigments.

To promote compatibility with the remaining coloring composition components, pigments used are in the form of aqueous dispersions (e.g., a combination of a pigment, an aqueous carrier, and a surfactant or dispersant system). From the standpoint of convenience, where pigments are used a commercial pigment dispersion is preferred, and many such dispersions are available. However, a pigment dispersion can also be prepared specifically for use in the coloring composition of the invention. Typical commercial dispersions contain about 30% to about 60% by weight active pigment ingredients.

In general, a workable pigment dispersion can have a wide or narrow particle size range depending on the delivery system used for the coloring composition. The lower limit on pigment particle size is determined not by any finctional characteristic of the coloring composition, but by the ability to form a stable dispersion. Similarly, the upper limit on pigment particle size is determined by the type of applicator by which the coloring composition is to be applied or dispensed, since pigment particle size determines the ability of the pigment particles to flow through, for example, the matrix of a marker nib. Indeed, relatively larger pigment particles can restrict coloring composition flow through many types of nibs commonly utilized in writing and marking instruments, ultimately rendering them inoperable. Larger particle sizes can, however, be used where the coloring composition is to be employed in a marker in which the coloring composition is dispensed through a valve assembly (e.g., a paint marker).

The pigment particle size can be adjusted depending on the exact nib type to be utilized in the writing or marking instrument in which the coloring composition will be placed. For example, one preferred form of the coloring composition of the invention can be utilized in a marking instrument having a porous plastic nib on account of the use of an ultrafine pigment dispersion having a particle size range of from about 0.05 $\mu$m to about 0.5 $\mu$m. Suitable commercial pigment preparations are those incorporating very small (e.g., less than about 0.5 $\mu$m) pigment particles. One such preparation is marketed by Hoechst-Celenese under the trade name HOSTAFINE. Another product line of pigment dispersions is manufactured by Heubach and marketed under the trade name HEUCOTECH.

The preferred colorants for use in the composition of the invention are dyes. The color of many dyes is sensitive to pH. Therefore, where a dye is employed as a colorant, preferably it is stable at a pH of greater than about 8, more preferably from about 9 to about 10, without shifting color appreciably at lower pH ranges as the hydroresistant film forms during application. Suitable dyes for use in the coloring composition are polymethine dyes, triphenylmethane dyes, cyanine dyes, methine dyes, and azo dyes which are stable in the presence of a pH of less than about 10. Many such dyes are commercially available and known in the art. Such dyes include the dyes marketed under the trade names BASACRYL X-RL YELLOW® (Basic Yellow 49), marketed by the BASF Corporation, ASTRAZON BLUE FRR® (Basic Blue 69), ASTRAZON BRILLIANT RED 4G® (Basic Red 14), and ASTRAZON PINK FBB® (Basic Red 49) by Bayer; and the dyes marketed under the trade names Acid Green 3 by International Dyestuffs Corporation, Acid Blue 93 and Acid Violet 19 marketed by Spectra Color Corporation, as well as mixtures thereof, Acid Blue 9, Acid Red 1, Acid Yellow 23 (Crompton & Knowles), F.D. & C. Yellow 6, as well as fugitive preparations of dyes, notably those marketed by Milliken, (e.g., Milliken Blue, Milliken Fluorescent Red, Milliken Magenta, Milliken Scarlet, Milliken Orange, Milliken black, etc.).

The minimum concentration of colorant which will produce a workable coloring composition is governed by the color intensity desired, although as little as 0.1% colorant by weight of the total composition can be sufficient for certain applications. The maximum workable concentration of colorant is determined largely by the ability to maintain a stable composition and the depth of color desired, and it can vary widely depending on the concentration of other components. However, a practical upper limit in the formulation of, for example, a marker ink is about 15% dye or about 10% to 30% pigment by weight of the total composition. The preferred concentration range for most applications is from about 1% to about 6% dye or from about 2% to about 10% active pigment by weight of the total composition. To ensure good coloration, a concentration of from about 1.5% to about 4% dye or from about 5% pigment by weight of the total composition is even more preferred when the coloring composition is to be used as marker ink.

The aqueous carrier used in the coloring composition of the invention is preferably deionized water. The amount of water present in coloring composition is typically from about 10% to about 90% by weight of the total composition, and this amount is in large part determined by the desired end use of the product (e.g., as an ink or a paint) and the amount of other components included in the color composition. To achieve a desirable viscosity when the coloring composition is used in the form of, for example, an ink, water is preferably present in an amount of from about 55% to about 75%, and most preferably from about 60% to about 70% by weight of the total composition. When the coloring composition is used as a paint, of course, the amount of water can be significantly less than these ranges.

In addition to having a film-forming agent, an alkalisoluble resin, and a colorant, the aqueous coloring composition also can include other constituents. Additives are useful to enhance stability, control viscosity, and promote long shelf life. Thus, the coloring composition can include a humectant, a surfactant, a preservative, a drying agent, a fragrance, a bittering agent, or other suitable compatible additive.

As mentioned, on exposure to the air, the film-forming agent crosslinks particularly quickly. Hence, the coloring composition can include a humectant when the composition is used in the form of an ink to retard premature drying of the nib of a writing instrument containing the coloring composition. The humectant ensures that the coloring composition does not prematurely crosslink on the surface of a marking system, such as those systems herein described. Typical humectants for inclusion in the coloring compositions of the present invention include polyhydric alcohols such as ethylene glycol, propylene glycol (PPG), hexylene glycol and polyethylene glycol (PEG), hydroxylated starches, and certain surfactants also can function as humectants. The humectant is preferably propylene glycol or glycerin.

The humectant (when included) is generally used in an amount of from about 1% to about 30% by weight of the total composition (e.g., 2 wt. % to about 20 wt. %), though this range is by no means critical. The amount of humectant to be added is determined by the type of nib used in the writing or marking instrument to be employed and the protection time period desired. A preferred composition incorporates propylene glycol as a humectant in an amount of from about 1% to about 10% by weight of the total composition. Another preferred composition includes glycerin as a humectant in an amount of from about 1% to about 2% by weight of the total composition.

For prolonged shelf life, the coloring composition can include a preservative to retard biotic contamination of the coloring composition. The preservative preferably serves as both a bactericide and a fungicide, and is added in any effective amount, although a typical concentration range is from about 0.1% to about 5% by weight of the total composition. The use of preservatives in levels greater than about 5% by weight of the total composition can cause the coloring composition to become toxic or unstable and is, in any event, unnecessary. Should alcohol be added to the composition as a drying agent, that alcohol also will function as a preservative to some extent.

Any conventional preservative compatible with the remaining ingredients is suitable for use in the invention. For example, preservatives manufactured by Hiils Corp., sold under the trade name NUOSEPT 95® (Bicyclicoxozolidine), by Dow Chemical Co. and sold under the trademarks DOWICIL 75® (1-(3-chloroallyl)-3,5,7-triaza-1-azoniaadamantane chloride) and DOWICIL 200® (3-chlorovinyl-hexamethylene tetranmonium chloride) or a preservative manufactured by Rohm and Haas and sold under the trademark KATHON PFM® (isothiazolinones), or a preservative manufactured by Sutton Labs and sold under the trademark GERMALL II® (imazolidinyl urea), or a preservative manufactured by Merck and sold under the trademark TEKTAMER 38® (1,2 dibromo-2,4-dicyanobutane), are suitable preservatives. Other acceptable preservatives include TROYSAN POLYPHASE P100®, a 3-iodo-2-Propynyl Butyl Carbamate sold by Troy Chemical which is typically mixed with PVP K-30®, a 2-Pyrrolidinone, 1-Ethenyl-, Homopolymer (($C_6MgNO)_x$ solubilizer sold by ISP Technologies Inc. and M-PYROL®, a 1-Methyl-Pyrrolidinone solubilizer sold by ISP Corporation. Many preservatives not stable under basic conditions can degrade at high pH to liberate reagents (e.g., formaldehyde) effecting crosslinking of the film-forming agent. Because film-forming agent is stable at high pH, preferably the preservative does not significantly degrade under alkaline conditions. Two such preferred preservatives are manufactured by Zeneca and sold under the trademarks PROXEL GXL™ and PROXEL DL™, and another alkaline-stable preservative is manufactured by Huls and sold under the under the trademark NUOSEPT 495™, each of these preparations uses 1,2-Benzisothiazolin-3-one as the active ingredient.

The coloring composition can also include one or more surfactants. The surfactants can be either ionic or nonionic surfactants. Some surfactants act by reducing the surface tension and energy of solution, thereby affecting a variety of parameters within the coloring composition. The presence of nonionic surfactants promotes the long-term stability of the coloring composition. In particular, some formulations lacking surfactants become progressively more viscous, due to the relatively large amount of solid material in the composition. In extreme cases, these solids can separate from the solution. The presence of a relatively small amount of a nonionic surfactant reduces or substantially eliminates this occurrence.

Additionally, by reducing surface tension, the surfactant reduces the viscosity of the coloring composition, thereby promoting more even flow of the coloring composition through the nib of a pen when the composition is used in the form of an ink. However, too much surfactant promotes strike-through of the coloring composition when applied to some substrates. Additionally, some surfactants (e.g., TAMOL 681) react with materials commonly employed in writing instruments. Hence, the choice of surfactant largely depends on the desired use of the coloring composition.

A suitable nonionic surfactant contemplated herein is SURFYNOL surfactant, sold by Air Products & Chemicals Inc., Allentown, Pennsylvania. Additionally, TAMOL 731, an anionic, polymer-type surfactant sold by Rohm and Haas Company at a concentration of 25% in solvent is a suitable surfactant. A surfactant such as Triton® X-405 (a mixture of 70% octylphenoxypolyethoxyethanol and 30% water), works well in compositions of the invention when used in amounts of 0.1% to about 1% by weight of the total composition (preferably above about 0.4 wt. %).

Other surfactants can act as a dye-blocking agent to promote fugitivity of the colorant. In some formulations of dyes, such as the Milliken dyes mentioned above, the chromophores are coupled to a moiety which is miscible in aqueous carriers, and are thus fugitive in comparison to the acid dyes themselves. However, many of these formulations react with certain resins, especially under basic conditions. Therefore, where acid dyes are used, a surfactant acting as a dye-blocking agent promotes fugitivity of the resulting mark. Such surfactants compete with the chromophores for binding sites on a substrate. Some surfactants suitable for use as dye-blocking agents are disclosed in U.S. Pat. Nos. 5,262,535, 5,507,863, 5,487,778. Other commonly employed surfactants having this dye-blocking ability are various salts of alkylated diphenyl oxide disulfonates. A preferred dye-blocking surfactant is manufactured by Dow Chemical and sold under the trade name DOWFAX 8390™.

While, as mentioned, the film-forming agent solidifies rapidly during application, in some applications an additional drying agent can be added to the coloring composition to effect more rapid film formation and to improve marking characteristics, particularly upon nonporous materials. Drying agents increase the overall volatility, thereby enhancing the evaporation rate of the water and the pH regulant. Any compatible material which performs this function can be used.

The drying agent preferably should be a volatile polar material to ensure compatibility with the primary components of the marker ink. Straight chain $C_2$–$C_4$ alcohols are effective, highly volatile drying agents, and, of these, ethanol is preferred because of its relatively low cost, its low toxicity, and because it does not contribute an unpleasant odor to the composition. Alcohols (e.g., conventional denatured alcohols, or preparations) can also provide added benefits, such as reducing surface tension, increasing adherence of the coloring composition to porous surfaces, and providing bactericidal activity when added to the coloring composition.

When utilized, the drying agent preferably is added from about 1% up to about 10% by weight of the total composition, with the most preferred concentration being about 3–8% by weight of the total composition, though these amounts are not critical to the practice of the invention. Indeed, the presence of the drying agent adversely affects stability of the coloring composition and can cause flocculation of the pigment, and significantly reduce cap-off time, unless other stabilizing additives are employed.

As mentioned, the coloring composition is preferably alkaline so that the alkali-soluble acrylic resins remain in solution and to avoid premature crosslinking. While the film-forming agents are available as highly alkaline aqueous emulsions, in some applications a pH regulant may be necessary in the composition to maintain the pH between about 9 and about 10. Any material that is compatible with the other components of the system and that performs this function can be used as a pH regulant. Among the preferred pH regulants for this composition are 2-amino-2-methyl-1-propanol (e.g., available as a 95 wt. % solution with water under the trademark AMP 95 from Angus Chemical Group, Inc.) and ammonium hydroxide. The volatility of the pH regulant affects the stability of the coloring composition during storage, and the use of a highly volatile pH regulant can cause the film-forning agent to crosslink prematurely. Thus, in general, a highly volatile pH regulant is avoided for achieving the objects of the invention. The most preferred pH regulant is AMP 95 because of its moderate to high volatility.

Furthermore, the coloring composition can include additional ingredients, provided the ingredients are compatible with the composition. For example, the coloring composition can include a fragrance. Any suitable fragrance can be employed to impart desired aromas. Many commercial fragrance preparations are compatible with the coloring composition, such as, for example, those marketed by Florasyth, Inc., Technology Fragrances and Flavors, Inc., and Shaw, Mudge, & Co., etc. Additionally, the composition can include a bittering agent, such as those commonly included in coloring compositions, to impart an unpleasant taste to the composition and thereby discourage ingestion of the composition.

The coloring composition is useful for forming a mark upon a substrate. Preferably, the mark is formed by applying the aqueous coloring composition to a first surface, upon which the film-forming agent forms a hydroresistant film. The film preferably includes some of the colorant and some of the alkali-soluble resin.

A preferred substrate has two surfaces (e.g., two opposing surfaces) such as a porous paper sheet (whereby the surfaces oppose each other). As used herein, "paper" includes any grade of paper as well as any paper-like material including, but not limited to, cotton fabric, onionskin, parchment, vellum, papyrus, or other similar material. The hydroresistant film reduces the degree to which the colorant penetrates the substrate, thereby minimizing or substantially preventing the formation of a second mark on the opposing surface (i.e., the film prevents strike-through of the colorant).

The degree to which strike-through is minimized depends on the nature of the substrate and the viscosity of the composition. For example, on highly porous paper (e.g., coloring book paper or newsprint) some minimal strike-through of a coloring composition having low viscosity can occur despite the presence of the film-forming agent. However, the strike-through mark is generally only about 10% as intense as the mark on the desired surface, and in many applications can be substantially lighter (e.g., about 5% or less).

As mentioned herein, the alkali-soluble resin can be dissolved only in basic solutions. Therefore, a mark made by the coloring composition of the invention is not fugitive upon contact with water unless the pH of the water is elevated to at least a level which would have been sufficient to dissolve the resin in its original state. Thus, ordinary tap water, rain water, atmospheric condensation, or other commonly present liquids, such as spilled beverages and the like, will, of course, have insufficient alkalinity to rewet or dissolve the alkali-soluble resin. As such, the coloring composition of the present invention is of a "permanent" nature compared with most aqueous inks and other coloring compositions. However, tap water combined with a soap, detergent, or bleach is sufficiently alkaline to dissolve the alkali-soluble resin and permit the hydroresistant film to be mechanically removed. Therefore, while permanent, marks made by coloring compositions of the present invention are readily washed from skin and common fabrics using common household reagents.

The coloring composition of the present invention can be applied by any means known for applying fluid to a substrate. For example, the composition can be applied with a paint brush, a split-tip fountain pen, a roller ball (which is analogous to a ball-point pen but has a much larger ball and uses much less viscous coloring composition than a conventional ball-point pen), an aerosol can or other fluid spraying apparatus, an absorbent pad, a paint roller, printing equipment, or other apparatus used for dispensing fluids having the properties of the present coloring composition. Preferably, the composition is suitably fluid for use in such marking instruments. Thus, for use in a such a standard marking instrument, the viscosity of the coloring composition preferably is from about 3 cps. to about 10 cps. (e.g., from about 4 cps. to about 8 cps.), and most preferably from about 5 cps. to about 7 cps. (e.g., about 6 cps.).

A capillary marker is the preferred instrument for applying the coloring composition. A capillary marker has a reservoir and a capillary nib. The reservoir of a typical capillary marker is an absorbent body stored in the handle of the marker. Any suitable reservoir compatible with the coloring composition can be used, such as, for example, an extruded polyester reservoir. The reservoir contains the coloring composition charge of the marker, and is capable of transferring coloring composition to the capillary nib. The nib of a capillary marker has one end in contact with the reservoir and a writing tip for contacting a substrate as its other end. The nib wicks the coloring composition from the reservoir to its writing tip. The writing tip of the nib is drawn across the surface of a substrate to be marked, dispensing the fluid on the surface. The nib can be made of any porous, preferably resilient material. Preferably, a porous plastic nib is used, but other nibs, such as pulltruded hollow nibs, ordinary felt nibs, and bonded fiber nibs, are also suitable.

The nib can have a well-defined, non-wearing writing tip, such as a chisel tip; hence, a capillary marker is the preferred instrument for applying the coloring composition. As is conventional in the capillary marker art, the tip can have edges of different dimensions. The same marker can be used to make bolder or lighter lines by drawing with one or another edge of the tip in contact with the writing medium.

While it is believed that one of skill in the art is fully able to practice the invention after reading the foregoing description, the following examples further illustrate some of its features. As these examples are included for purely illustrative purposes, they should not be construed to limit the scope of the invention in any respect.

In particular, these examples present 35 separate coloring compositions of the present invention suitable for use in common writing instruments. Physical properties of the exemplary compositions, notably color and viscosity, were measured, as was pH. It was also noted whether the compositions remained stable over time at ambient (25° C.) and elevated temperatures (60° C.). Each of the coloring compositions was loaded into a variety of different writing instruments (e.g., pens, markers, etc.) to apply marks to surfaces and to determine if the coloring compositions were compatible with various commonly-employed marker nibs. In particular, the strike-through of the marks was determined, as well as the fugitivity of the marks from skin and common fabrics.

EXAMPLE 1

In this example, three coloring compositions were prepared without using surfactants. In formulating the compositions of the present invention, a first premix was formed by mixing an alkali-soluble resin emulsion (ACRYSOL WS-24) with water and adding a pH regulant (ammonium hydroxide) until a pH between about 8.0 and about 10.0 is achieved. At this pH, the resin is dissolved. AMP-95 premix (48% of the commercial emulsion, 48% water, and 4% AMP-95, all by weight of the premix) was then added as a pH regulant to ensure that the final composition is sufficiently alkaline. A second premix was then formed by adding water to the colorant solutions. A third premix included a preservative (Troysan polyphase P100) at 0.2% by weight of the premix, a surfactant (PVP K-30 powder) at 2% by weight of the premix, all in M-Pyrol. These premixes were mixed together with the film-forming agent (MAINCOTE FASTRACK-77) and other ingredients (where included) to form the coloring compositions. The formulae of the compositions are presented in Table 1, along with a measure of viscosity.

The pH of these three coloring compositions varied between 9 and 10. Each of the three coloring compositions exhibited superior washability from common fabrics and skin. Each of them was sufficiently fluid to work in common markers, and in each of the markers tested, they performed well. When applied to porous paper, each of the three exhibited minimal strike-through, and it was observed that the three or more successive applications of the coloring composition over the same area of paper deposited a glossy mark. The three formulations were not stable for prolonged periods either at room temperature or elevated temperatures, either exhibiting signs of dryness or shifting of the color due to interaction of the dyes with the composition.

EXAMPLE 2

In this example, eight additional coloring compositions were prepared. Six of these included a small amount of surfactant (SURFYNOL 72) to decrease dry time. The formulae of the compositions are presented in Table 2, along with a measure of viscosity and pH.

Each of the coloring compositions exhibited superior fugitivity from skin; however, the compositions did not wash well from fabrics, especially cotton. Each of them was sufficiently fluid to work in common markers, and in each of the markers tested, they performed well. When applied to porous paper, each exhibited minimal strike-through. The formulations were not stable for prolonged periods either at room temperature or elevated temperatures, either exhibiting signs of dryness or shifting of the color due to interaction of the dyes with the composition.

EXAMPLE 3

In this example, eight additional coloring compositions were prepared. These coloring compositions incorporate the nonionic surfactant Triton X-405, and include a preservative which is more stable at higher pH (Proxel GXL). Additionally, where Acid blue dye was employed, the coloring compositions incorporated a dye-blocking surfactant (Dowfax 8390) to promote long-term color stability. The formulae of the compositions are presented in Table 3, along with a measure of viscosity and pH.

Each of the eight coloring compositions exhibited superior fugitivity from skin. Each is sufficiently fluid to work in common markers, and in each of the markers tested, they performed well. When applied to porous paper, each exhibited minimal strike-through. The compositions incorporating F.D. & C. yellow dye exhibited some color shifting during prolonged storage. Moreover, some of the dyes thickened or solidified during prolonged storage at 60° C.

EXAMPLE 4

In this example, eight additional coloring compositions were prepared. These coloring compositions were similar to those in example 3, however an increased amount of Triton X-405 was added to promote solution stability over long storage. Additionally, the use of Milliken Orange dye in place of F.D. & C yellow minimized color shifting. The formulae of the compositions are presented in Table 4, along with a measure of viscosity and pH.

Each of the eight coloring compositions exhibited superior fugitivity. Each of them was sufficiently fluid to work in common markers, and in each of the markers tested, they performed well, without nib drying even up to 90 minutes of "cap off" time in 40% humidity at room temperature. When applied to porous paper, each exhibited minimal strike-through. Moreover, the compositions remained stable at elevated temperatures, neither thickening appreciably nor exhibiting significant color shifting.

EXAMPLE 5

In this example, eight additional coloring compositions were prepared. These coloring compositions included DT211NA (Dow Chemical Co.) as a source of film-forming agent. The compositions were prepared by first making a premix, similar to that described in Example 1, of the following ingredients in the following proportions by weight:

| Ingredient | Percent by Weight |
| --- | --- |
| Water | 74.06% |
| PROXEL DL | 1.29% |
| ARYSOL WS-24 | 17.73% |
| TRITON X-405 | 1.14% |

-continued

| Ingredient | Percent by Weight |
| --- | --- |
| Glycerine | 4% |
| Fragrance | 0.86% |

This premixture was then combined with other ingredients as indicated in Table 5.

Each of the eight coloring compositions exhibited superior fugitivity. Each of them was sufficiently fluid to work in common markers, and in each of the markers tested, they performed well, without nib drying even up to 90 minutes of "cap off" time in 40% humidity at room temperature. When applied to porous paper, each exhibited minimal strike-through. Moreover, the compositions remained stable at elevated temperatures, neither thickening appreciably nor exhibiting significant color shifting.

All of the references cited herein, including patents, patent applications, and publications, are hereby incorporated in their entireties by reference.

While this invention has been described with an emphasis on preferred embodiments, it will be obvious to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

TABLE 1

| | Composition | | |
| --- | --- | --- | --- |
| | 1 | 2 | 3 |
| | Color | | |
| | blue | green | orange |
| Water | 23.6 g | 29.4 g | 33.6 g |
| Preservative Premix | 2.6 g | 2.6 g | 2.6 g |
| NuoSept 95 | 0.3 g | 0.3 g | 0.3 g |
| Glycerin | 1.4 g | 1.4 g | 1.4 g |
| 50 g Acrysol WS-24 | 8.0 g | 8.0 g | 8.0 g |
| AMP-95 | 0.1 g | 0.1 g | 0.1 g |
| Fastrack-77 | 53 g | 53 g | 53 g |
| Acid Yellow 23 | | 0.1 g | |
| F.D. & C. Yellow 6 | | | 4.0 g |
| Milliken Blue | 8.0 g | 8.4 g | |
| Viscosity (cps.) | 6.0 | 6.0 | 6.0 |

TABLE 2

| Composition | 4 | 5 | 6 | 7 | 8 | 9 | 10 | 11 |
|---|---|---|---|---|---|---|---|---|
| Color | Orange | Black | Blue | Green | Red | Brown | Violet | Yellow |
| Water | 33.6 g | 23.64 g | 22.86 g | 27.26 g | 29.78 g | 29.46 g | 28.14 g | 34.26 g |
| Preservative Premix | 2.66 g | 2.66 g | 1.8 g | 1.8 g | 1.8 g | 1.8 g | 1.8 g | 1.8 g |
| NuoSept 95 | 0.3 g | 0.3 g | 0.14 g | 0.14 g | 0.14 g | 0.14 g | 0.14 g | 0.14 g |
| Glycerin | 1.4 g | 1.4 g | 1 g | 1 g | | | 1 g | 1 g |
| 5 g Acrysol WS-24 | 8 g | 8 g | 7 g | 6.8 g | 6.8 g | 6.8 g | 6.8 g | 6.8 g |
| AMP-95 | | | | 0.2 g | 0.2 g | 0.2 g | 0.2 g | 0.2 g |
| Fastrack-77 | 53 g | 53 g | 53 g | 53 g | 53 g | 53 g | 53 g | 53 g |
| SURFYNOL 72 | | | 0.2 g | 0.2 g | 0.2 g | 0.2 g | 0.2 g | 0.2 g |
| Acid Yellow 23 | | | | | 1.2 g | | | 2.6 g |
| F.D. & C. Yellow 6 | 4 g | | | | | 1.2 g | | |
| Milliken Blue | | | 8 g | 8.4 g | | 1 g | 0.72 g | |
| Milliken Flour. Red | | | 6 g | | 1 g | 5.2 g | 1.4 g | |
| Milliken Magenta | | | | | | | 6.6 g | |
| Milliken Scarlet | | | | | 7 g | | | |
| Milliken Black | | 14 g | | | 7 g | | | |
| Viscosity (cps.) | 6.5 | 6.8 | 7.6 | 7.1 | 6.6 | 7.3 | 7.4 | 7.3 |

TABLE 3

| Composition | 12 | 13 | 14 | 15 | 16 | 17 | 18 | 19 |
|---|---|---|---|---|---|---|---|---|
| Color | orange | yellow | blue | green | red | putple | brown | black |
| Water | 36.1 g | 38.1 g | 28.92 g | 32.54 g | 31.44 g | 29.02 g | 29.66 g | 30.86 g |
| Proxel GXL | 0.2 g | 0.2 g | 0.2 g | 0.2 g | 0.2 g | 0.2 g | 0.2 g | 0.2 g |
| Glycerin | 1.4 g | 1.4 g | 1.4 g | 1.4 g | 1.4 g | 1.4 g | 1.4 g | 1.4 g |
| 5 g Acrysol WS-24 | 8 g | 8 g | 8 g | 8 g | 8 g | 8 g | 8 g | 8 g |
| Triton X-45 | 0.3 g | 0.3 g | 0.2 g | 0.2 g | 0.2 g | 0.2 g | 0.2 g | 0.2 g |
| Fastrack-77 | 53 g | 53 g | 53 g | 53 g | 53 g | 53 g | 53 g | 53 g |
| Dowfax 839 | | | 6 g | 6 g | 7 g | 4 g | 4 g | 7 g |
| Acid Blue 9 | | | 1 g | 1 g | | 8 g | 0.14 g | 0.9 g |
| Acid Red 1 | | | | | 1.4 g | | | 0.9 g |
| Acid Yellow 23 | | 2 g | | 0.66 g | | | | |
| F.D. & C. Yellow 6 | 4 g | | | | 0.34 g | | 1.2 g | 0.44 g |
| Milliken Flour. Red | | | 4.28 g | | | 7.5 g | 5.2 g | |
| Viscosity (cps.) | 6.4 | 5.4 | 6.8 | 5.8 | 6.3 | 6.7 | 6.5 | 6.3 |
| pH | 9.4 | 9.3 | 9.4 | 9.5 | 9.5 | 9.4 | 9.4 | 9.5 |

TABLE 4

| Composition | 20 | 21 | 22 | 23 | 24 | 25 | 26 | 27 |
|---|---|---|---|---|---|---|---|---|
| color | orange | yellow | blue | green | red | purple | brown | black |
| Water | 34 g | 38.3 g | 28.72 g | 31.34 g | 31.24 g | 28.42 g | 27.66 g | 30.55 g |
| Proxel GXL | 0.2 g | 0.2 g | 0.2 g | 0.2 g | 0.2 g | 0.2 g | 0.2 g | 0.2 g |
| Glycerin | 1.4 g | 1.4 g | 1.4 g | 1.4 g | 1.4 g | 1.4 g | 1.4 g | 1.4 g |
| 5 g Acrysol WS-24 | 8 g | 8 g | 8 g | 8 g | 8 g | 8 g | 8 g | 8 g |
| Triton X-45 | 0.4 g | 0.4 g | 0.4 g | 0.4 g | 0.4 g | 0.4 g | 0.4 g | 0.4 g |
| Fastrack-77 | 53 g | 53 g | 53 g | 53 g | 53 g | 53 g | 53 g | 53 g |
| Dowfax 839 | | | 6 g | 7 g | 7 g | 4 g | 4 g | 7 g |
| Acid BLue 9 | | | 1 g | 1 g | | 8 g | 0.14 g | 0.85 g |
| Acid Red 1 | | | | | 1.4 g | | | 0.85 g |
| Acid Yellow 23 | | 1.7 g | | 0.66 g | 2 g | | | |
| F.D. & C. Yellow 6 | 2 g | | | | .34 g | | | |
| Milliken Flour. Red | | | 4.28 g | | | 7.5 g | 5.2 g | |
| Milliken orange | 4 g | | | | | | 3 g | 0.75 g |
| Viscosity | 6.0 | 5.2 | 6.9 | 6.2 | 6.6 | 6.8 | 6.6 | 6.4 |
| pH | 9.7 | 9.6 | 9.8 | 9.7 | 9.7 | 9.8 | 9.7 | 9.7 |
| density (g/L) | 1048.52 | 1044.87 | 1047.32 | 1048.52 | 1049.73 | 1043.72 | 1046.12 | 1052.13 |
| s.t. (d/cm) | 38.2 | 36.9 | 40.4 | 37.8 | 35.9 | 4.03 | 38.3 | 37.2 |

TABLE 5

| composition | 28 | 29 | 30 | 31 | 32 | 33 | 34 | 35 |
|---|---|---|---|---|---|---|---|---|
| color | Marine | Birch | Lavender | Tangerine | Pink | Clover | Banana | Charcoal |
| ACRYSOL Premix | 34.96 % | 34.96 % | 34.96% | 34.96% | 34.96% | 34.96% | 34.96% | 34.96% |
| Water | 0.14% | 0.56% | | 1.04% | 1.29% | 2.78% | 2.04% | 1.73 |
| DT211NA | 54% | 54% | 54% | 54% | 54% | 54% | 54% | 54% |
| DOWFAX 8390 | 7% | 4% | 4% | 4% | 6% | 7% | 7% | 7% |
| Millikin Orange | | 2.26% | | 4% | | | | |
| Millikin Fl. Red | 3.6% | 4.16% | 7% | | 3% | | | |
| F.D & C. Yellow 6 | | | | 2% | | | | |
| Food Blue 5 | .3% | .06% | .04% | | | .66% | | .4% |
| Acid Red 1 | | | | | .75% | | | 1.11% |
| Acid Yellow 3 | | | | | | | 1.44% | 0.8% |
| Acid Yellow 36 | | | | | | .6% | .56% | |
| Viscosity (cps) | 6.3 | 6 | 6.2 | 6.1 | 5.8 | 5.75 | 6.1 | 5.9 |
| pH | 10.2 | 10 | 10 | 10 | 10 | 10 | 10.1 | 10 |
| density (g/l) | 1047.28 | 1046.08 | 1047.28 | 1053.27 | 1049.67 | 1046.08 | 1055.67 | 1056.86 |
| s.t. (d/cm) | 33.7 | 33.6 | 35.5 | 33.6 | 36.8 | 38.6 | 34.1 | 34.2 |
| Specific Gravity | 1.05 | 1.05 | 1.05 | 1.05 | 1.05 | 1.05 | 1.06 | 1.06 |

What is claimed is:

1. A coloring composition comprising:
   a) from about 15 wt. % to about 40 wt % pH-sensitive film-forming agent,
   b) from about 0.5 wt. % to about 10 wt % alkali-soluble resin,
   c) from about 10 wt. % to about 90 wt % aqueous carrier, and
   d) a colorant comprising one or more dyes, pigments, or combinations thereof, wherein said dyes represent from about 0 wt % to about 15 wt % and wherein said pigments represent from about 0 wt % to about 30 wt %, wherein said coloring composition has a pH of from about 8 to about 12.

2. The coloring composition of claim 1, having a pH of from about 9 to about 10.

3. The coloring composition of claim 1, having a viscosity of from about 4 cps. to about 8 cps.

4. The coloring composition of claim 1, wherein said film-forming agent represents about 15% to about 30% by weight of said aqueous coloring composition.

5. The coloring composition of claim 1, wherein said film-forming agent comprises a latex and a polyfunctional amine.

6. The coloring composition of claim 5, wherein said latex contains at least one acid functional monomer.

7. The coloring composition of claim 6, wherein said acid functional monomer is acrylic acid or methacrylic acid or a combination thereof.

8. The coloring composition of claim 5, wherein said latex has a weight-average molecular weight of from about 500 to about 5,000,000.

9. The coloring composition of claim 5, wherein said latex is said polyfunctional amine.

10. The coloring composition of claim 1, wherein said alkali-soluble resin is present in an amount of from about 1% to about 5% by weight of said aqueous coloring composition.

11. The coloring composition of claim 1, further comprising a humectant.

12. The coloring composition of claim 1, further comprising a surfactant.

13. The coloring composition of claim 1, further comprising a preservative.

14. The coloring composition of claim 1, flrther comprising a drying agent.

15. The coloring composition of claim 1, further comprising a pH regulant.

16. The coloring composition of claim 1, further comprising a fragrance.

17. The coloring composition of claim 1, further comprising a bittering agent.

18. A mark upon a substrate formed by applying the coloring composition of claim 1 to said substrate, such that said film-forming agent forms a hydroresistant film adhering to said substrate and said colorant binds to said film.

19. A writing instrument comprising the coloring composition of claim 1, wherein said instrument comprises a nib and a reservoir containing said coloring composition.

20. The writing instrument of claim 19, wherein said nib is porous plastic.

* * * * *

UNITED STATES PATENT AND TRADEMARK OFFICE
CERTIFICATE OF CORRECTION

PATENT NO. : 6,160,034
DATED : December 12, 2000
INVENTOR(S) : Keith Allison; Richard Kaiser It is certified that errors appear in the above-identified patent and that said Letters Patent is hereby corrected as shown below:

In Column 2, line 32: "instrunents" should read --instruments--

In Column 9, line 2: "Huls" should read --Hüls--

In Column 10, line 34: "film-forning" should read --film-forming--

Signed and Sealed this

First Day of May, 2001

Attest:

NICHOLAS P. GODICI

Attesting Officer

Acting Director of the United States Patent and Trademark Office